(12) United States Patent
Pupillo et al.

(10) Patent No.: US 11,453,363 B2
(45) Date of Patent: Sep. 27, 2022

(54) VEHICLE CABIN SAFETY SYSTEM AND METHOD

(71) Applicant: Kostal of America, Inc., Troy, MI (US)

(72) Inventors: Fabio Pupillo, Clinton Township, MI (US); Adrian Kizy, Sterling Heights, MI (US); Christine Kashat, Commerce, MI (US)

(73) Assignee: Kostal of America, Inc., Troy, MI (US)

( * ) Notice: Subject to any disclaimer, the term of this patent is extended or adjusted under 35 U.S.C. 154(b) by 283 days.

(21) Appl. No.: 16/789,607

(22) Filed: Feb. 13, 2020

(65) Prior Publication Data

US 2021/0253063 A1  Aug. 19, 2021

(51) Int. Cl.

| | |
|---|---|
| *B60R 22/00* | (2006.01) |
| *B60R 25/102* | (2013.01) |
| *B60R 25/24* | (2013.01) |
| *B60R 25/20* | (2013.01) |
| *B60R 25/31* | (2013.01) |
| *B60N 2/00* | (2006.01) |
| *B60H 1/00* | (2006.01) |
| *B60R 25/30* | (2013.01) |
| *B60Q 1/50* | (2006.01) |
| *B60Q 1/46* | (2006.01) |
| *B60Q 5/00* | (2006.01) |
| *B60R 25/104* | (2013.01) |

(52) U.S. Cl.
CPC ....... *B60R 25/102* (2013.01); *B60H 1/00742* (2013.01); *B60N 2/002* (2013.01); *B60Q 1/46* (2013.01); *B60Q 1/50* (2013.01); *B60Q 5/005* (2013.01); *B60R 25/104* (2013.01); *B60R 25/2063* (2013.01); *B60R 25/24* (2013.01); *B60R 25/305* (2013.01); *B60R 25/31* (2013.01)

(58) Field of Classification Search
CPC . B60R 25/102; B60R 25/104; B60R 25/2063; B60R 25/24; B60R 25/305; B60R 25/31; B60H 1/00742; B60N 2/002; B60Q 1/46; B60Q 1/50; B60Q 5/005
USPC .......................................................... 701/48
See application file for complete search history.

(56) References Cited

U.S. PATENT DOCUMENTS

| | | | |
|---|---|---|---|
| 6,420,975 B1* | 7/2002 | DeLine | H04M 1/6075 340/815.4 |
| 6,922,147 B1* | 7/2005 | Viksnins | G08B 21/0208 340/522 |
| 6,922,622 B2 | 7/2005 | Dulin et al. | |
| 7,079,016 B2* | 7/2006 | Ho | G08B 21/22 340/426.25 |
| 7,170,401 B1* | 1/2007 | Cole | B60N 2/002 340/439 |

(Continued)

*Primary Examiner* — Zhen Y Wu
(74) *Attorney, Agent, or Firm* — Gunther Evanina; Butzel Long, PC

(57) ABSTRACT

A vehicle cabin hazard detection and management system includes an engine state sensor, a driver presence sensor, a cabin passenger sensor, a door latch sensor for each passenger door, a vehicle movement sensor, a cabin temperature sensor, an alarm device, a wireless messaging system, and a controller. The controller receives signals from the sensors, evaluates whether a hazardous condition is imminent for a cabin occupant, and activates an alarm and/or takes other action to counter the hazard.

19 Claims, 4 Drawing Sheets

(56) References Cited

U.S. PATENT DOCUMENTS

| | | | | |
|---|---|---|---|---|
| 8,044,782 | B2 * | 10/2011 | Saban | B60N 2/002 |
| | | | | 340/439 |
| 8,892,302 | B1 * | 11/2014 | McDonald | G08B 21/22 |
| | | | | 701/36 |
| 9,227,484 | B1 | 1/2016 | Justice et al. | |
| 9,545,856 | B2 * | 1/2017 | Borgne | G08B 21/22 |
| 2004/0113797 | A1 * | 6/2004 | Osborne | G08B 21/22 |
| | | | | 340/573.4 |
| 2007/0268119 | A1 * | 11/2007 | Cram | B60Q 9/00 |
| | | | | 340/457 |
| 2009/0005936 | A1 * | 1/2009 | Browne | B60R 25/102 |
| | | | | 701/45 |
| 2009/0027188 | A1 * | 1/2009 | Saban | B60N 2/002 |
| | | | | 340/439 |
| 2009/0237229 | A1 * | 9/2009 | Kautz | B60N 2/002 |
| | | | | 340/457 |
| 2011/0267186 | A1 * | 11/2011 | Rao | B60H 1/00978 |
| | | | | 348/E5.09 |
| 2012/0050021 | A1 * | 3/2012 | Rao | B60N 2/28 |
| | | | | 340/425.5 |
| 2017/0103638 | A1 * | 4/2017 | Henry | G08B 3/1016 |
| 2017/0282822 | A1 * | 10/2017 | Hunter, Jr. | G08B 21/02 |
| 2018/0053397 | A1 * | 2/2018 | Kaur | G08B 21/24 |
| 2018/0253959 | A1 * | 9/2018 | Andrade | G08B 21/24 |

* cited by examiner

VEHICLE CABIN SAFETY SYSTEM AND METHOD

FIELD OF THE DISCLOSURE

This disclosure pertains to systems and methods for detecting hazardous environmental conditions for occupants of a vehicle cabin, and correcting and/or warning others of the hazard. More particularly, the systems and methods are designed to detect cabin temperatures that could cause hyperthermia or hypothermia to an occupant in an unattended vehicle.

BACKGROUND OF THE DISCLOSURE

Every year several deaths occur as a result of occupants being left, intentionally or unintentionally, without supervision, inside a vehicle. Reports of this nature seem to be relentlessly on the news with statistically noticeable peaks in the summertime and receding, but nonetheless still concerning, lows in the wintertime. Although these terrible and, in most cases, avoidable tragedies make headlines and raise awareness of the danger associated with leaving occupants in vehicles, the number of occurrences is unfortunately and undeniably on the rise not only in the United States but also in the rest of the world. The year 2018 was the worst year for child hot-car deaths in the United States with 54 fatalities nationwide.

Such fatalities (either human or pets) are, in the vast majority of cases, caused by hyperthermia resulting from overheating of the vehicle interior exposed to direct sunlight. Other scenarios involve hypothermia resulting from the inability to maintain the body temperature above a certain level due to the vehicle being left in frigid cold weather. Even in those instances where deaths are not recorded, permanent long term damage to vital organs such as brain, heart and kidneys can occur.

Blaming these tragedies on bad parenting (or bad caregiving) is usually the first emotional response. However, a true understanding of the problem and therefore the development of a solution requires further and more in depth analysis. In many cases what kills occupants is not necessarily bad parenting (or bad caregiving) but circumstances. Something as simple as a lapse in temporal memory or a disrupted routine account for the vast majority of the deaths.

It is becoming more and more evident that there is a need for a device to be installed in vehicles that monitors the interior, predicts temperature extremes that would endanger the safety of occupants and that alerts others to the presence of endangered occupants.

SUMMARY OF THE DISCLOSURE

The disclosed cabin hazard detection and management systems use a combination of an ignition switch state sensor, a driver presence sensor, cabin occupant sensors, door latch sensors, vehicle movement sensors, a temperature sensor, an alarm signaling device, a wireless messaging system and a controller to analyze for potentially hazardous temperature conditions for the driver or occupants within a vehicle cabin and take appropriate corrective measures including activating the alarm device and/or the messaging system (e.g., a cellular telephone) to transmit a distress call or text message to an emergency responder.

The controller can be configured to activate the alarm device within a relatively short time (e.g., 15 to 30 seconds) after the driver has turned off the vehicle and exited the cabin while at least one occupant has been detected, regardless of the temperature reading detected in the vehicle cabin, such that the driver is warned of an unattended occupant while the driver is still in close proximity to the vehicle.

The controller can be configured to evaluate whether a hazardous temperature condition in the vehicle is imminent based on a combination of an exterior temperature reading (i.e., the temperature of the ambient air outside the cabin) and the cabin reading. For example, the controller can be configured to warn of an imminent hazard whenever the exterior temperature sensor is below a low temperature threshold or above a high temperature threshold, regardless of the cabin temperature.

DETAILED DESCRIPTION

Figure 1:
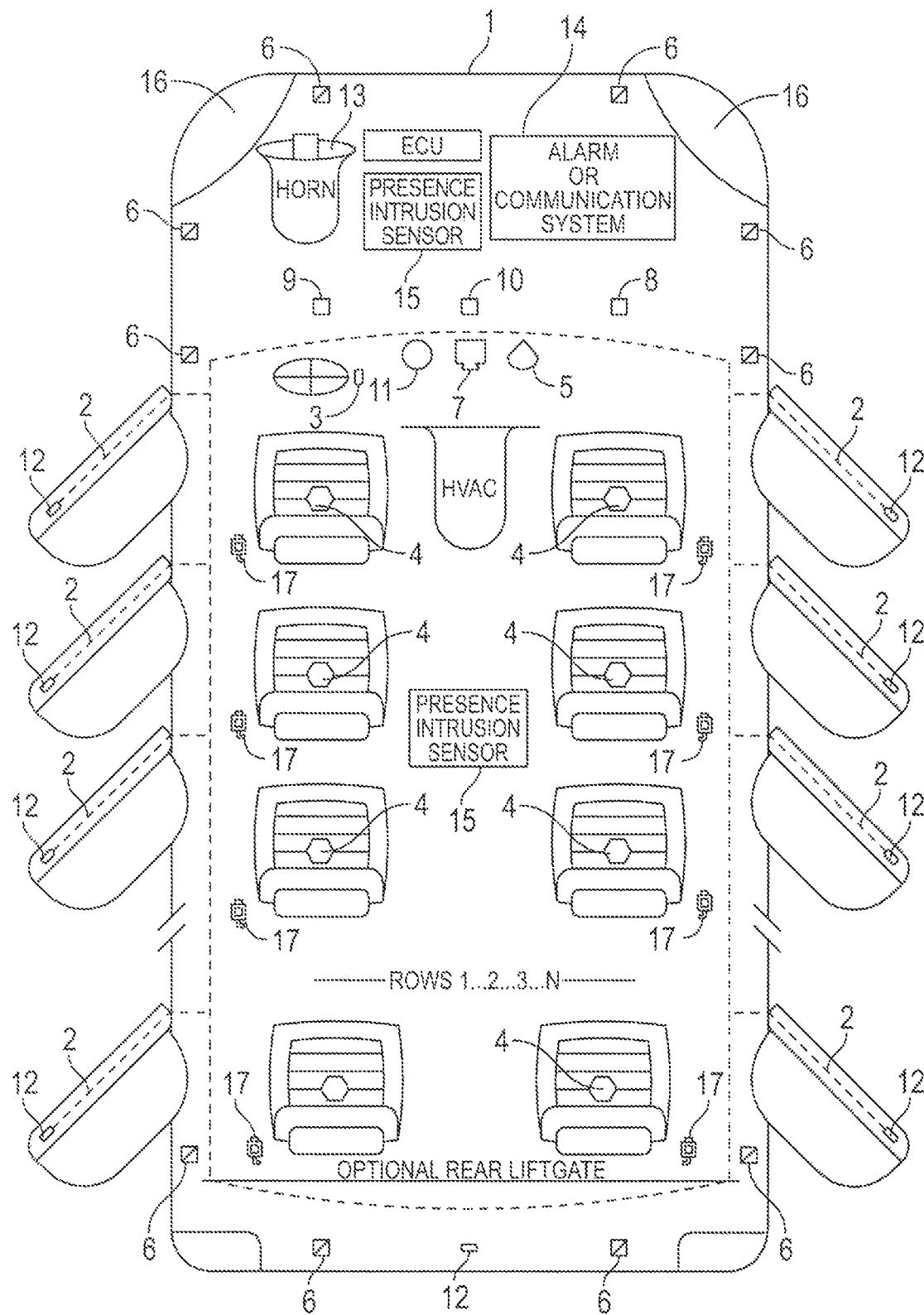
FIG. 1 is a schematic top view of a vehicle equipped with a cabin hazard detection and hazard management system in accordance with this disclosure.

As illustrated in FIG. 1, the systems can rely on a combination of devices which are standard equipment in many vehicles, such as temperature sensors (for outside 9 and inside 8 temperature monitoring), light sensors 10, oxygen sensors 11, lock/unlock release switches 12 to monitor opening and closing of doors (or any other access point to the vehicle), seat pressure sensors 4, horn 13, alarm system and any sort of communication system such as OnStar or similar 14. These sub-systems will provide inputs and outputs to one or more presence and intrusion sensor units 15 inside the vehicle which monitor the cabin for either a stationary or moving occupant via integrated circuits and through a high performance radar system.

The initialization of the system can be prompted in several ways. Monitoring the vehicle 1 access and exit points 2, detection of the ignition switch's state 3, sensing of weight on seats 4, sensing of sounds and motion inside the vehicle's cabin 5, monitoring of proximity sensors around the vehicle 6, sampling of video data and analysis of heat maps 7 (if vehicle is so equipped), routine (time-based) checks and random sampling are some of the triggers to the system.

When one or more of the conditions above are met, then the system is armed. It will then monitor the cabin interior and, based on the vehicle's state, perform checks to discern whether or not a potentially unsafe situation could develop. Interior temperature cabin prediction and possible presence of a responsible party will prompt initial and, depending on circumstances, long term responses as outlined in the workflows shown below. Immediate responses such as beeping the horn 13 or flashing the headlights 16 can be initiated if the system deems a responsible party has just exited the vehicle or is in close proximity.

More long term responses such as Emergency calls over available communication systems, activation of the HVAC or rolling down of the window can be performed if the gravity of the situation requires so. The flowcharts below define the circumstances under which either immediate or long term responses are initiated.

In certain preferred aspects of this disclosure, the system cannot be disabled and is integrated in the vehicle equipment. It does not solely rely on weight sensing or motion sensing or on temperature thresholds/ranges for activation. It includes internal cabin temperature prediction to initiate response. It does not require direct line of sight to the occupant being monitored. The system can be interrogated upon request by a user as a way of confirming remotely if presence inside the vehicle is detected.

As used herein, the term "unattended" refers to a vehicle in which the driver's seat of the vehicle is unoccupied. "Occupants" include humans or other mammals situated anywhere within the cabin, and optionally the trunk or other luggage/storage compartment or space that can be detected by an occupant sensor. Thus, occupants can include the driver, passengers, and pets.

An "engine state sensor" refers to a sensor that detects the position of the ignition switch of a conventional combustion engine vehicle or a "power-on" state in the case of an electric engine vehicle. It can also refer to other sensors that detect when the engine is running, and/or that the vehicle is moving or has recently moved. Such sensors can include speedometers, accelerometers, and/or motion sensors.

The driver presence sensor and other cabin and/or trunk occupant sensors can comprise at least one camera, microphone, infrared sensor, oxygen sensor, carbon dioxide sensor, motion detector, seat cushion and/or seat back mass or pressure sensor, and/or floor mass or pressure sensor. A microprocessor or other computing device running an occupant detection algorithm can be used in association with the driver/occupant detection sensor(s) to reduce or eliminate driver/occupant detection errors.

The vehicle movement sensing system can be an accelerometer, speedometer, tachometer or other electromechanical device capable of signaling to the vehicle cabin hazard detection system controller that the vehicle is moving or has at least recently moved.

The cabin temperature sensor can be a thermistor, thermocouple, thermostat or other temperature sensing device that measures and transmits cabin temperature to the controller.

The alarm signaling device can range from an instrument panel warning light, such as when the risk of hazard is not imminent and a driver is seated in the vehicle, to wireless communication (e.g., cellular telephone text message and/or recorded audio message) to an emergency responder (e.g., local police or fire department, etc.). Other alarms include flashing the vehicle headlights and tail lights, and/or sounding the vehicle horn or other audible alarm.

In certain cases when a hazardous cabin condition is detected, corrective electromechanical actions can be taken, such as lowering windows, turning on air conditioning or ventilation, etc.

Figure 2:
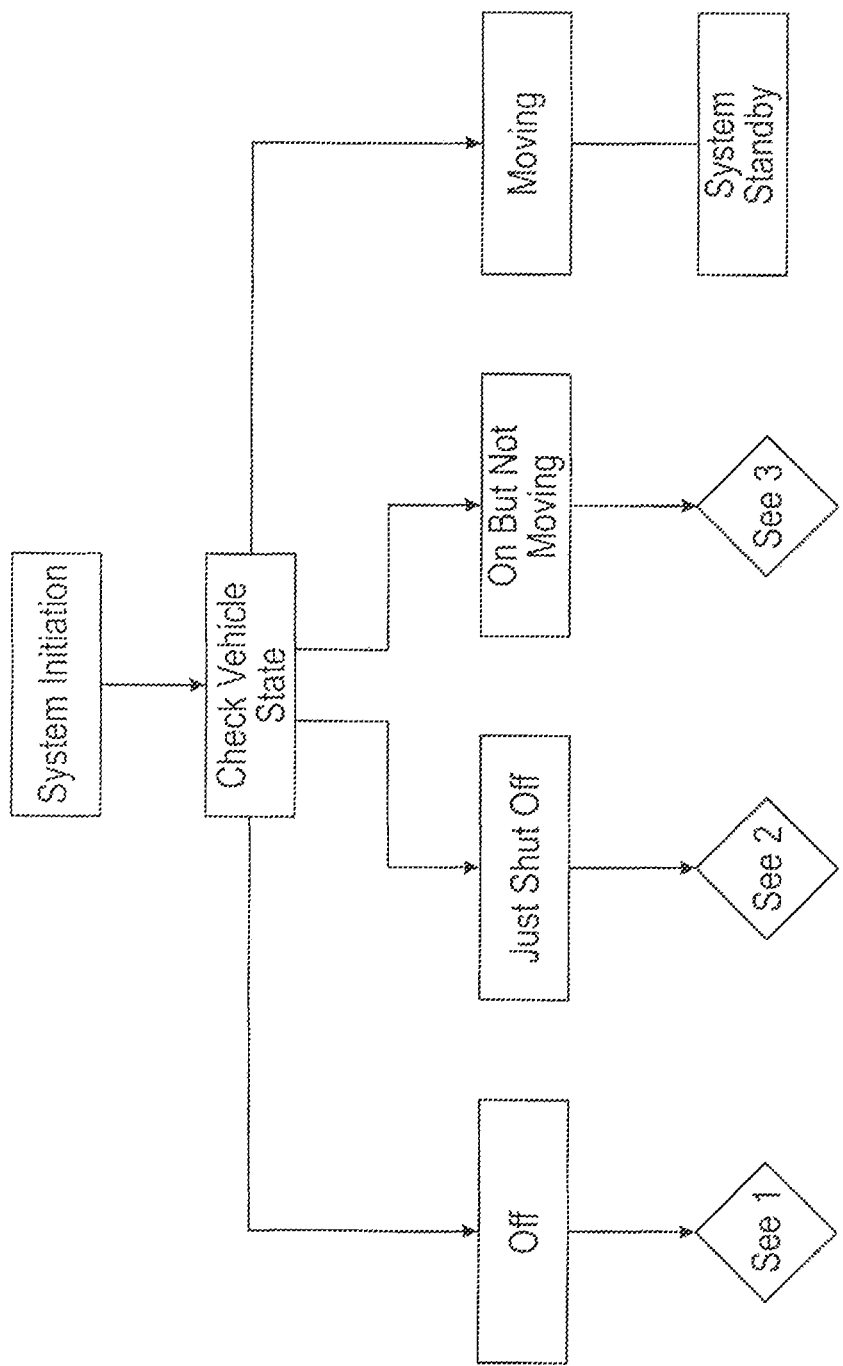
FIG. 2 is a flowchart showing initialization of the system.
Figure 3:
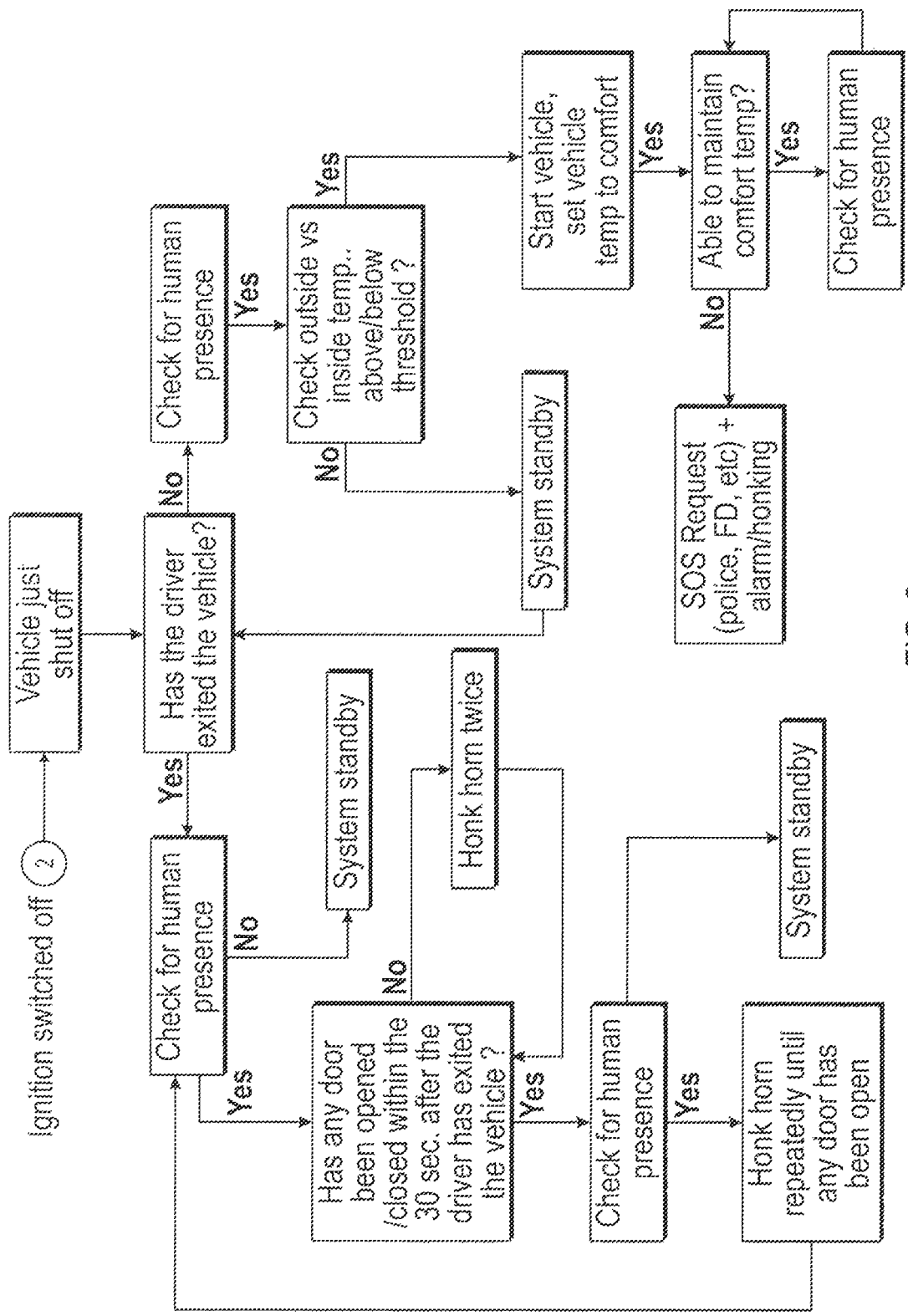
FIG. 3 is a flowchart showing a process for preventing hazardous occupied cabin temperature conditions when the vehicle has been switched off.
Figure 4:
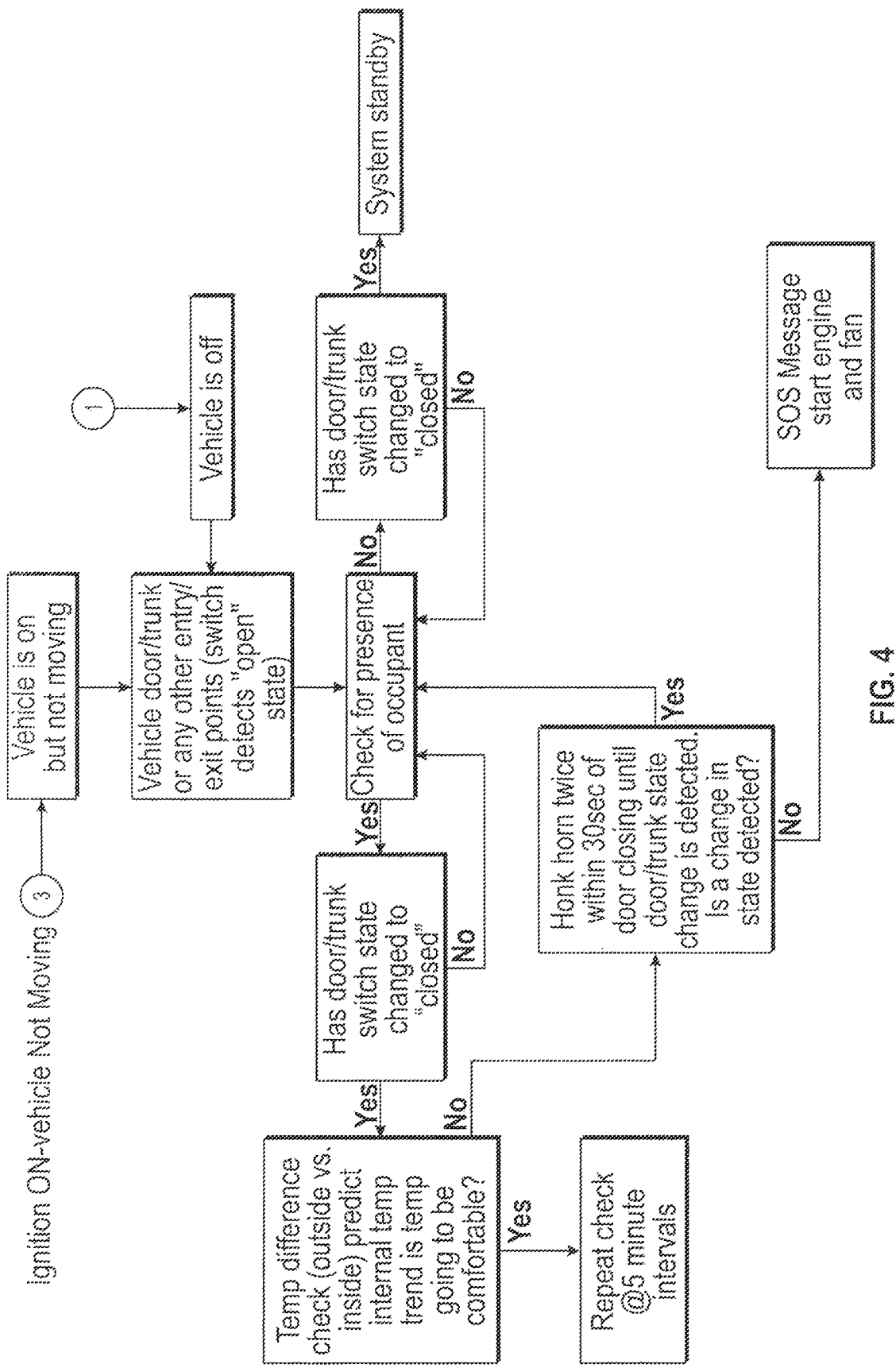
FIG. 4 is a flowchart showing a process for checking and alerting others when hazardous temperature conditions are imminent in a closed occupied vehicle.

FIG. 2 illustrates a process for determining the vehicle state. When the vehicle is moving or has recently moved (e.g., within for example 90 seconds), the system remains in a standby mode, meaning that the steps shown in FIGS. 3 and 4 are not taken. Vehicle state can be determined periodically (e.g., every five minutes), or upon the occurrence of a triggering event (e.g., ignition or power switch turned off). In the case where the ignition switch or vehicle power switch is turned off, or the vehicle has not been moving while the ignition-power switch is in the "on" position, the system checks for the presence of occupants. If occupants are not present, the system returns to the system standby mode. Otherwise, inside and/or outside temperature is checked periodically to detect whether a hazardous condition to an occupant in a closed vehicle is imminent. When an imminent hazard is detected, an alarm is activated (e.g., cellular telephone call to emergency responder) and/or the vehicle engine and HVAC are turned on.

In the case when the ignition/power switch has been just shut-off (e.g., within a few seconds or less), it is first determined whether the driver has exited the vehicle, as shown in FIG. 2. If the driver has not exited the vehicle, the outside and/or inside temperatures are periodically checked to determine whether a hazardous cabin condition is imminent. If an imminent hazardous cabin condition is detected while the driver is seated in the vehicle, the vehicle is turned "on" and the HVAC is activated and set to maintain a comfortable cabin condition. However, the system continues to monitor the cabin condition and activates an alarm if a comfortable cabin condition cannot be maintained.

If the ignition/power switch has just been shut-off (e.g., within a few seconds or less) and it is determined that the driver has exited from the vehicle, the system checks if there are occupants (other than the driver) in the cabin (and optionally trunk or luggage/storage compartment). If there are no occupants in the vehicle, the system is placed in the standby mode. Otherwise, an alarm is activated (e.g., horn sounded) within a predetermined time (e.g., 30 seconds) after the driver has exited, in order to alert the driver that an occupant has been left unattended in a closed vehicle. A continuous audible alarm, flashing lights, and/or cellular telephone alert can be initiated if the driver does not respond to the hazard.

In certain embodiments, both in-cabin and outside temperature readings from corresponding sensors are analyzed to predict an imminent hazard to unattended vehicle occupants. For example, when an extremely high outdoor temperature is signaled (e.g., a sensor reading over 90° C.), the system could activate alarms and/or take corrective actions even if the cabin temperature is still acceptable. The system could also employ an algorithm that predicts that a hazard is imminent based on the combination of temperature readings.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

What is claimed is:

1. A vehicle cabin hazard detection and management system for a vehicle having an ignition switch, at least one passenger door, power door locks, power windows, and an HVAC system, comprising:
   an engine state sensor;
   a driver presence sensor;
   a cabin passenger sensor;
   a door latch sensor associated with each passenger door to detect when the associated door is open;
   a vehicle movement sensing system;
   a cabin temperature sensor;
   an alarm signaling device;
   a wireless messaging system for communicating an imminent hazardous condition for a cabin occupant; and
   a controller for receiving signal inputs from the sensors, analyzing the inputs to evaluate whether a hazardous condition exists or is imminent for a cabin occupant, and generating an output signal to activate at least one of the alarm signaling device, the wireless messaging system, power door locks, power windows, vehicle ignition switch and HVAC system when a hazardous condition exists or is imminent for a cabin occupant,
wherein the controller is configured to activate the alarm device within a first predetermined time after the driver has turned off the ignition switch and exited the vehicle cabin, and at least one occupant has been detected, regardless of temperature readings from the temperature sensor wherein the vehicle movement sensing system reports a condition of non-movement only after a movement sensor has not detected movement over a second predetermined time period.

2. The system of claim 1, wherein the system is configured to be interrogated upon request by a remote user to determine whether a hazardous condition exists or is imminent for a cabin occupant.

3. The system of claim 1, wherein the system is configured to notify a remote user of intruder entry of the vehicle cabin.

4. The system of claim 1, wherein the system further comprises proximity detectors arranged to detect when a person is in close proximity to the vehicle.

5. The system of claim 4, wherein the system is configured to notify a remote user when a person is in close proximity to the vehicle.

6. The system of claim 1, wherein the driver presence sensor is a motion detector, infrared sensor, seat cushion or seat back mass or pressure sensor, floor mass or pressure sensor or camera.

7. The system of claim 1, wherein the movement sensor is a speedometer, an accelerometer or an ultrasound sensor.

8. The system of claim 1, wherein the alarm signaling device is an audible alarm.

9. The system of claim 8, wherein the audible alarm is a horn or siren.

10. The system of claim 1, wherein the alarm signaling device is a visual alarm.

11. The system of claim 10, wherein the visual alarm is flashing headlights and/or tail lights.

12. The system of claim 10, wherein the visual alarm is a dash warning light.

13. The system of claim 1, wherein the cabin occupant sensor is at least one of a camera, a microphone, an infrared sensor, an oxygen sensor, a carbon dioxide sensor, a motion detector, a seat cushion or seat back mass or pressure sensor, or a floor mass or pressure sensor.

14. The system of claim 1, wherein the system is configured to check for the presence of a driver when the engine state is off, determine whether the cabin temperature sensor is providing a temperature reading indicative of an imminent hazard when the driver is present in the vehicle cabin, and turn on the ignition switch and HVAC system when a cabin temperature indicative of an imminent hazard to the driver is detected to attempt to maintain a comfortable temperature in the vehicle cabin.

15. The system of claim 14, wherein the temperature in the vehicle is periodically monitored to determine whether the driver is present and whether a comfortable temperature is being maintained in the vehicle cabin, and communicating via the wireless messaging system an imminent hazardous condition for the driver when a comfortable temperature is not maintained.

16. The system of claim 1, wherein the system is configured to check for the presence of a cabin occupant when the ignition switch is on and the movement sensing system reports a condition of non-movement while a door latch sensor detects an open door, determine whether the cabin temperature sensor is providing a temperature reading indicative of an imminent hazard to the occupant when the door latch sensor detects that the opened door has been closed, activate an alarm signaling device when an occupant is detected in a closed cabin having an interior temperature that is indicative of an imminent hazard to the occupant, and after a third predetermined time period communicate via the wireless messaging system an imminent hazardous condition for the occupant when the occupant remain present in the closed vehicle cabin having a hazardous interior temperature.

17. The system of claim 1, wherein the system is configured to check for the presence of a cabin occupant when the ignition switch is off and a door latch sensor detects an open door, determine whether the cabin temperature sensor is providing a temperature reading indicative of an imminent hazard to the occupant when the door latch sensor detects that the opened door has been closed, activate an alarm signaling device when an occupant is detected in a closed cabin having an interior temperature that is indicative of an imminent hazard to the occupant, and after a third predetermined time period communicate via the wireless messaging system an imminent hazardous condition for the occupant when the occupant remain present in the closed vehicle cabin having a hazardous interior temperature.

18. A vehicle cabin hazard detection and management system for a vehicle having an ignition switch, at least one passenger door, power door locks, power windows, and an HVAC system, comprising:
   an engine state sensor;
   a driver presence sensor;
   a cabin passenger sensor;
   a door latch sensor associated with each passenger door to detect when the associated door is open;
   a vehicle movement sensing system;
   a cabin temperature sensor;
   an exterior temperature sensor;
   an alarm signaling device;
   a wireless messaging system for communicating an imminent hazardous condition for a cabin occupant; and
   a controller for receiving signal inputs from the sensors, analyzing the inputs to evaluate whether a hazardous condition exists or is imminent for a cabin occupant, and generating an output signal to activate at least one of the alarm signaling device, the wireless messaging system, power door locks, power windows, vehicle ignition switch and HVAC system when a hazardous condition exists or is imminent for a cabin occupant,
   wherein the controller is configured to activate the alarm device within a first predetermined time after the driver has turned off the ignition switch and exited the vehicle cabin, and at least one occupant has been detected, regardless of temperature readings from the temperature sensor,
   wherein the controller is configured to evaluate whether a hazardous condition for a cabin occupant is imminent based on the temperature readings from both the cabin temperature sensor and the exterior temperature sensor.

19. The system of claim 18, wherein a condition of imminent hazard to an occupant is triggered when the exterior temperature is below a low temperature threshold or above a high temperature threshold, regardless of the cabin temperature.

\* \* \* \* \*